Jan. 21, 1936.     J. C. CURTIS     2,028,320
ROCK DRILL SUPPORTING FRAME
Filed Dec. 6, 1934
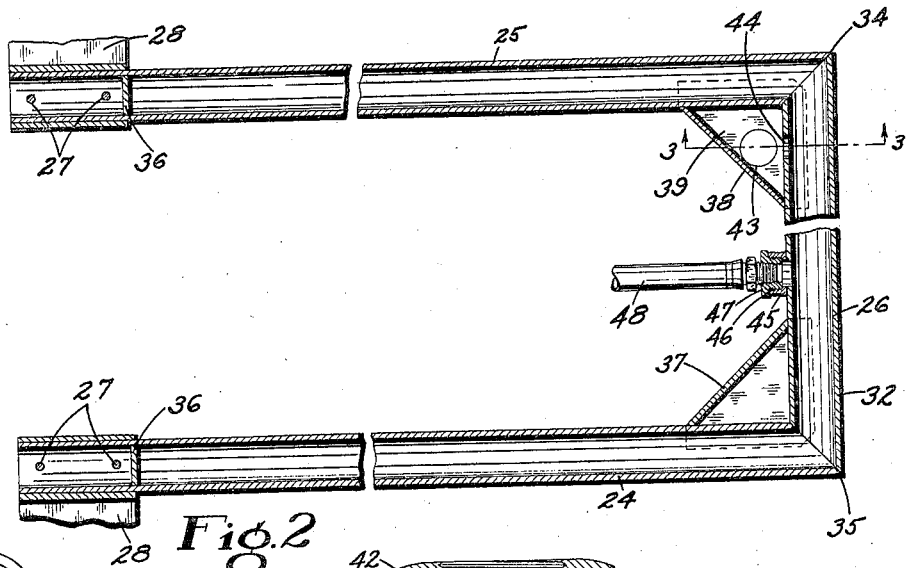
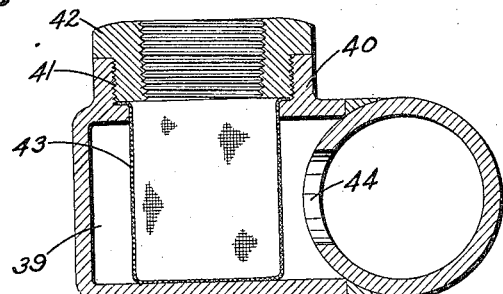
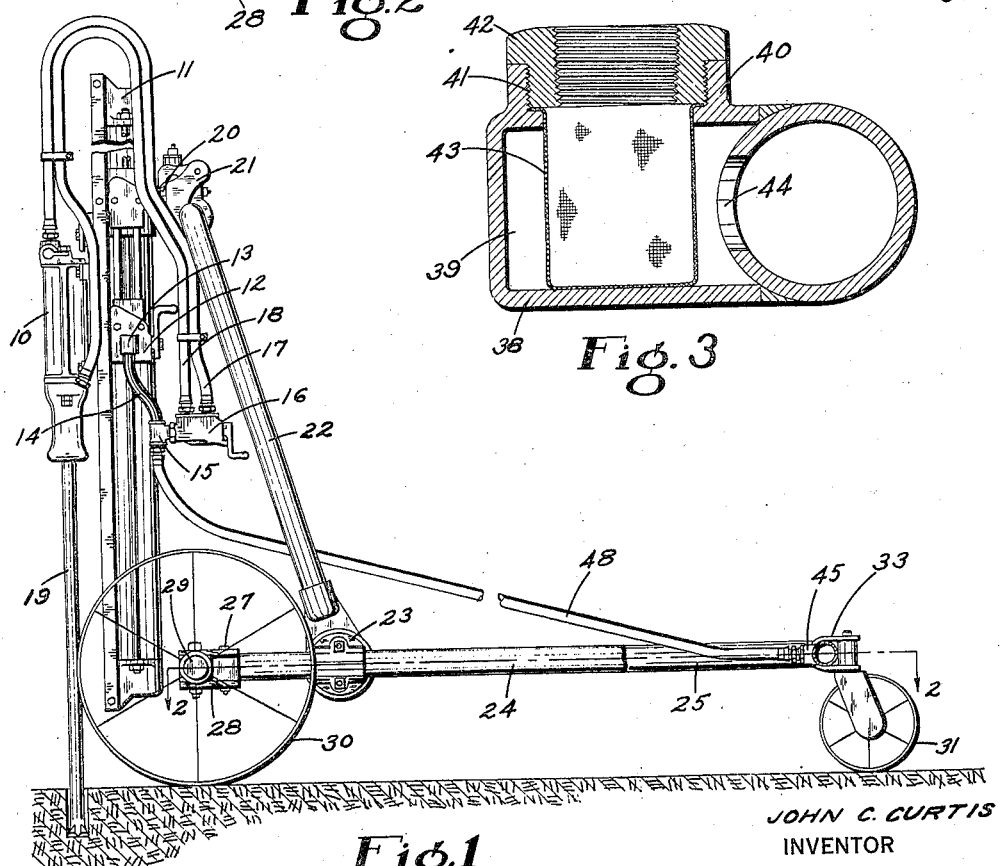
JOHN C. CURTIS
INVENTOR
BY
ATTORNEY Patented Jan. 21, 1936

2,028,320

UNITED STATES PATENT OFFICE 2,028,320

ROCK DRILL SUPPORTING FRAME

John C. Curtis, Garfield Heights, Ohio, assignor to The Cleveland Rock Drill Company, Cleveland, Ohio, a corporation of Ohio Application December 6, 1934, Serial No. 756,324

4 Claims. (Cl. 255—51)

This invention relates broadly to rock drills, but more particularly to the frame supporting the latter.

The object of this invention is to produce a hollow rock drill supporting frame manufactured in a manner whereby the hollowness thereof constitutes a fluid tight reservoir from which motive fluid may be admitted to the drill for actuating the latter.

Other objects and advantages of this invention willl be apparent from the following detailed description wherein similar characters of reference designate corresponding parts and wherein:

Fig. 1 is a side elevational view of a drilling apparatus having the invention applied thereto.

Fig. 2 is an enlarged sectional view of the supporting frame taken in a plane indicated by line 2—2 in Fig. 1.

Fig. 3 is an enlarged cross sectional view taken in a plane indicated by line 3—3 in Fig. 1.

Referring to the drawing, 10 represents a fluid actuated rock drill slidably mounted on an elongated frame 11 having therein a fluid actuated feeding mechanism capable of imparting feeding motion to the drill. Secured to the side of the elongated frame 11, there is a valve housing 12 having a valve rotatable therein capable of controlling the admission of the pressure fluid into the feeding mechanism. The housing 12 is formed with a connection 13 adapted to receive one end of a short pipe 14, while the other end is terminated by a T-shaped connection 15 to which may be secured a throttle valve housing 16 having a valve rotatable therein for controlling the admission of the pressure fluid into two flexible conduits 17 and 18 attached to the housing 16. The conduit 17 is connected at the rear of the rock drill 10 for admitting pressure fluid therein for actuating the latter, while the conduit 18 is connected toward the front of the rock for admitting pressure to the drill steel 19 mounted therein for cleaning the drilled hole.

Located in substantially equidistant relation with the ends thereof, the elongated frame 11 is formed with a cone 20 cooperating with a clamping device 21 by which the frame may be secured to a substantially U-shaped member 22. Each of the free ends of said last member is equipped with a clamping mechanism 23 by which the member 22 may be affixed to the side members 24 and 25 of a frame 26. Secured to each of the free ends of the side members 24 and 25 by means of transversely disposed bolts 37, there is a bracket 28 adapted to carry a shaft 29 upon which a frame supporting wheel 30 is rotatably mounted, while the other end of the frame is supported by a caster wheel 31 secured to the frame cross end member 32 by a bracket 33 welded thereon.

Referring now more particularly to the present invention, the frame 26 is formed of a plurality of tubular members welded together as at 34 and 35 in a manner affording a fluid tight joint between the members. Toward the free end of the side members 24 and 25, there is welded therein a plate 36 affording an air tight joint with the interior wall of the frame, and thereby transforming the interior of the latter in an air tight reservoir. The frame 26 is reinforced by braces 37 and 38 disposed across the inner corners thereof. These braces are made of flat stock bent to a substantially U-shaped cross section having the open marginal edges thereof welded to the frame 26, affording thereby within each of said braces an air tight chamber 39. Welded to the upper wall of the brace 38, there is a boss 40 provided with a screw threaded aperture 41 opening into the chamber 39 and adapted to receive in screw threaded engagement therewith a pipe bushing 42. This bushing is also internally threaded to receive one end of a motive fluid conveying conduit. Within the chamber 39 of the brace 38 may be disposed a screen 43 preferably made cylindrical and having the open end portions thereof secured within the bore 41. In this instance, the motive fluid conveyed by the conduit secured to the bushing 42 is filtered through the screen 43 before its admission in the chamber 39, from where it is free to flow into the frame reservoir through an enlarged port 44. Welded at any place to the frame 26 but preferably to the cross member 32, there is a boss 45 provided with a screw threaded aperture 46 opening into the frame reservoir. This aperture is adapted to receive a pipe bushing 47 which is also internally threaded to receive the end of a flexible conduit 48, while the other end thereof is affixed to the T-shaped connection 15 secured to the valve housing 16.

In the present construction, it will be seen that the compressed air or the pressure fluid may be admitted into the frame 26 through the connection 42 from where it is free to flow to the rock drill 10 through the connection 47 and conduit 48. The reservoir being of a relatively large capacity and being located near the rock drill, will prevent the pulsation of the motive fluid resulting from the operation of the rock drill, to be transmitted into the usually long conduit connecting the compressor or source of supply to the drill, thus reducing the frictional resistance within that conduit and thereby increasing the efficiency of the drill.

Although the foregoing description is necessarily of a detailed character, in order to completely set forth the invention, it is to be understood that the specific terminology is not intended to be restrictive or confining and it is to be further understood that various modification of structural detail may be resorted to without departing from the scope or spirit of the invention as herein claimed.

I claim:

1. In a drilling apparatus, a substantially U-shaped hollow frame supporting a fluid actuable drill movable relatively thereto, the interior of said frame constituting a fluid tight reservoir, hollow braces welded to said frame across the inner corners thereof, the interior of at least one of said braces constituting a fluid tight chamber, an inlet port leading from said chamber into said reservoir, means provided within said one brace capable of receiving one end of a fluid conduit for admitting fluid into said reservoir via said chamber and inlet port, and an outlet port leading from the interior of said reservoir adapted to receive one end of a conduit through which fluid from said reservoir may be admitted to the drill for actuating the latter.

2. In a drilling apparatus, a hollow frame having a fluid actuable drill carried thereby, the interior of said frame constituting a fluid tight reservoir, a frame reinforcing hollow member secured to said frame in a manner affording the interior of said member to constitute a fluid tight chamber, an inlet port leading from said chamber into said reservoir, means within said member capable of receiving one end of a fluid conduit for admitting fluid into said reservoir via said chamber and inlet port, and an outlet port leading from the interior of said reservoir adapted to receive one end of a conduit through which fluid from said reservoir may be admitted to the drill for actuating the same.

3. In a drilling apparatus, a hollow frame having a fluid actuable drill carried thereby, the interior of said frame constituting a fluid tight reservoir, a frame reinforcing hollow member secured to said frame in a manner affording the interior of said member to constitute a fluid tight chamber, an inlet port leading from said chamber into said reservoir, means within said member capable of receiving one end of a fluid conduit for admitting fluid into said reservoir via said chamber and inlet port, means within said chamber adapted to filter fluid into said reservoir through said inlet port, and an outlet port leading from the interior of said reservoir adapted to receive one end of a conduit through which fluid from said reservoir may be admitted to the drill for actuating the same.

4. In a drilling apparatus, a frame constituting a substantially U-shaped tube normally open at both ends, a fluid actuable drill carried by said frame, a wheel supporting element carried by each of the open end portion of said tube, means within said tube in spaced relation from the open ends thereof affording the interior of said tube intermediate said open end portions to constitute a fluid tight reservoir, and means including passages for admitting fluid into said reservoir and delivering the same to the drill carried by said frame.

JOHN C. CURTIS.